(12) United States Patent
Jeon et al.

(10) Patent No.: US 11,561,428 B2
(45) Date of Patent: Jan. 24, 2023

(54) OPTICAL DEVICE

(71) Applicant: LG Chem, Ltd., Seoul (KR)

(72) Inventors: Byoung Kun Jeon, Daejeon (KR); Moon Soo Park, Daejeon (KR); Seong Min Lee, Daejeon (KR); Ji Hoon Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/495,516

(22) PCT Filed: Apr. 25, 2018

(86) PCT No.: PCT/KR2018/004783
§ 371 (c)(1),
(2) Date: Sep. 19, 2019

(87) PCT Pub. No.: WO2018/199616
PCT Pub. Date: Nov. 1, 2018

(65) Prior Publication Data
US 2020/0019008 A1    Jan. 16, 2020

(30) Foreign Application Priority Data

Apr. 25, 2017   (KR) ........................ 10-2017-0053016

(51) Int. Cl.
*G02F 1/1335*   (2006.01)
*G02F 1/1337*   (2006.01)
(Continued)

(52) U.S. Cl.
CPC ...... *G02F 1/133528* (2013.01); *G02F 1/1337* (2013.01); *G02F 1/13394* (2013.01); *G02F 1/13725* (2013.01); *B60J 3/04* (2013.01); *G02F 1/133565* (2021.01); *G02F 2202/04* (2013.01); *G02F 2202/28* (2013.01)

(58) Field of Classification Search
CPC ............ G02F 1/1337; G02F 1/133725; G02F 1/133528; G02F 1/13394
See application file for complete search history.

(56) References Cited

U.S. PATENT DOCUMENTS 4,671,617 A   6/1987 Hara
7,898,625 B2   3/2011 Hayashi et al.
(Continued)

FOREIGN PATENT DOCUMENTS

CA   2 668 275   * 12/2009
CN   1407131 A    4/2003
(Continued)

OTHER PUBLICATIONS

Extended European Search Report including the Written Opinion for Application No. EP 18791818.0 dated Dec. 16, 2019, 9 pages.
(Continued)

*Primary Examiner* — Dung T Nguyen
(74) *Attorney, Agent, or Firm* — Lerner, David, Littenberg, Krumholz & Mentlik, LLP

(57) ABSTRACT

An optical device capable of varying transmittance, such that can be used for various applications such as eyewear, for example, sunglasses or AR (augmented reality) or VR (virtual reality) eyewear, an outer wall of a building or a sunroof for a vehicle.

15 Claims, 3 Drawing Sheets

(51) Int. Cl.
  *G02F 1/1339* (2006.01)
  *G02F 1/137* (2006.01)
  *B60J 3/04* (2006.01)

(56) References Cited

U.S. PATENT DOCUMENTS

| | | | |
|---|---|---|---|
| 8,657,456 B2* | 2/2014 | Yamagata | G09F 9/33 |
| | | | 362/97.1 |
| 9,162,915 B1* | 10/2015 | Wilenski | B32B 27/32 |
| 9,904,129 B2 | 2/2018 | Min et al. | |
| 2003/0072891 A1 | 4/2003 | Murakami et al. | |
| 2005/0266239 A1 | 12/2005 | Satake et al. | |
| 2005/0271834 A1 | 12/2005 | Michihata | |
| 2006/0068517 A1* | 3/2006 | Yu | G02B 5/3016 |
| | | | 438/27 |
| 2006/0182901 A1 | 8/2006 | Takagi | |
| 2006/0291030 A1 | 12/2006 | Niiyama et al. | |
| 2009/0290113 A1 | 11/2009 | Nakahata et al. | |
| 2011/0111140 A1 | 5/2011 | Jang et al. | |
| 2012/0020056 A1 | 1/2012 | Yamagata et al. | |
| 2013/0141656 A1 | 6/2013 | Kujawa et al. | |
| 2014/0226112 A1 | 8/2014 | Kim | |
| 2016/0041425 A1* | 2/2016 | Oh | G02B 5/3083 |
| | | | 349/12 |
| 2018/0063980 A1 | 3/2018 | Shin et al. | |
| 2018/0355172 A1* | 12/2018 | Uno | B32B 27/281 |
| 2019/0202180 A1* | 7/2019 | Tokinoya | B32B 27/365 |
| 2020/0057335 A1 | 2/2020 | Lee et al. | |

FOREIGN PATENT DOCUMENTS

| | | |
|---|---|---|
| CN | 1492267 A | 4/2004 |
| CN | 1867620 A | 11/2006 |
| CN | 1872901 A | 12/2006 |
| CN | 102369235 A | 3/2012 |
| CN | 102922836 A | 2/2013 |
| CN | 103069333 A | 4/2013 |
| CN | 107121854 A | 9/2017 |
| JP | H01276120 A | 11/1989 |
| JP | H0224630 A | 1/1990 |
| JP | 2004-046121 A | 2/2004 |
| JP | 2007004085 A | 1/2007 |
| JP | 2007078870 A | 3/2007 |
| JP | 2009093143 A | 4/2009 |
| JP | 2010009017 A | 1/2010 |
| JP | 2012159695 A | 8/2012 |
| JP | 2013531276 A | 8/2013 |
| JP | 2014-186345 A | 10/2014 |
| JP | 2014529769 A | 11/2014 |
| JP | 2017042914 A | 3/2017 |
| JP | 2019534475 A | 11/2019 |
| KR | 2001-0113559 A | 12/2001 |
| KR | 2002-0020238 A | 3/2002 |
| KR | 20060053902 A | 5/2006 |
| KR | 20080096256 A | 10/2008 |
| KR | 20090038840 A | 4/2009 |
| KR | 2015-0105266 A | 9/2015 |
| KR | 101630119 B1 | 6/2016 |
| KR | 20170038579 A | 4/2017 |
| TW | 200611032 A | 4/2006 |
| WO | 2010125976 A1 | 11/2010 |

OTHER PUBLICATIONS

International Search Report in PCT/KR2018/004783, dated Jul. 30, 2018, 2 pages.
Chinese Search Report for Application No. 201880013425.2, dated Jul. 7, 2021, 3 pages.

* cited by examiner

[Figure 1]
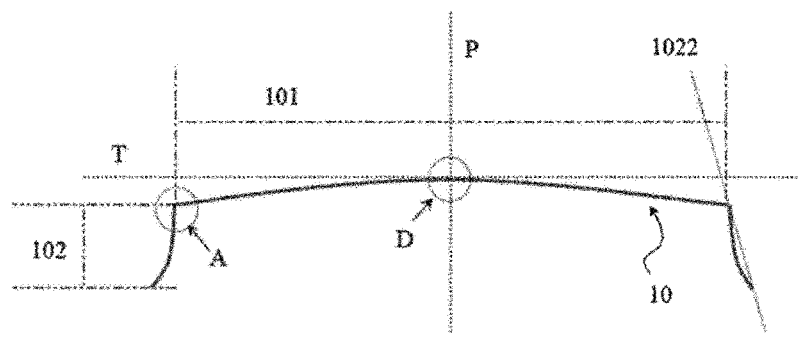
[Figure 2]
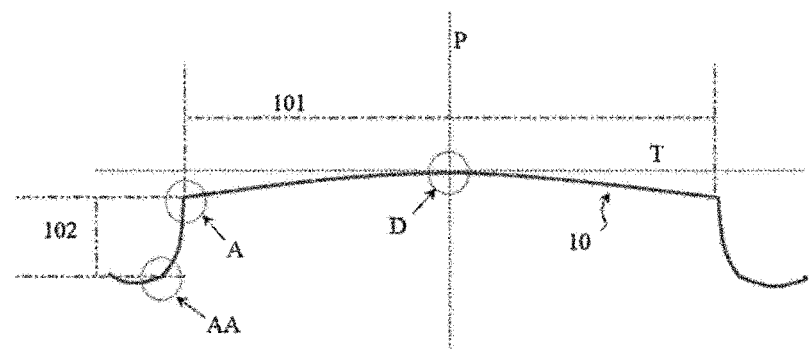

[Figure 3]
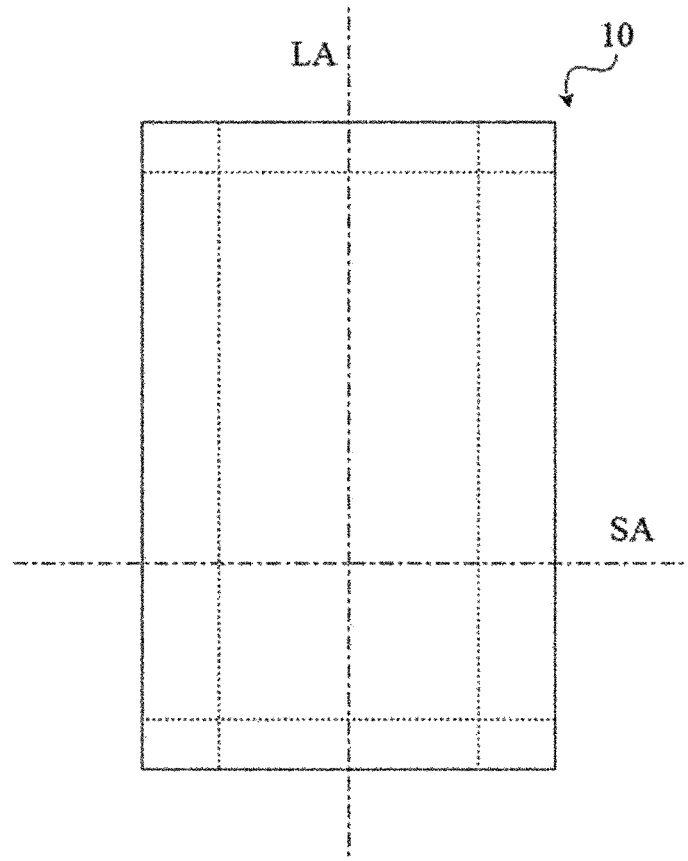
[Figure 4]
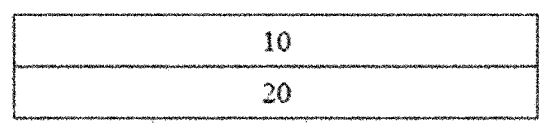
[Figure 5]
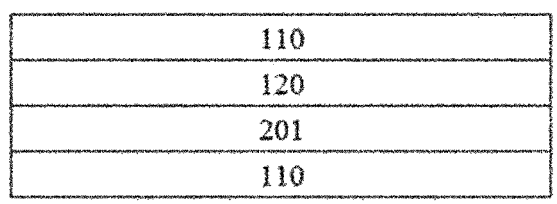

[Figure 6]
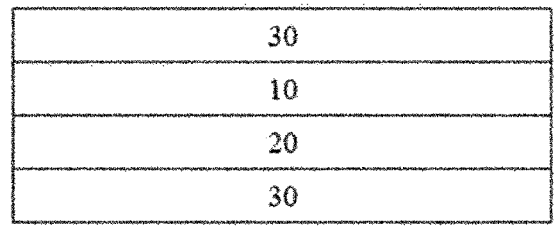
[Figure 7]
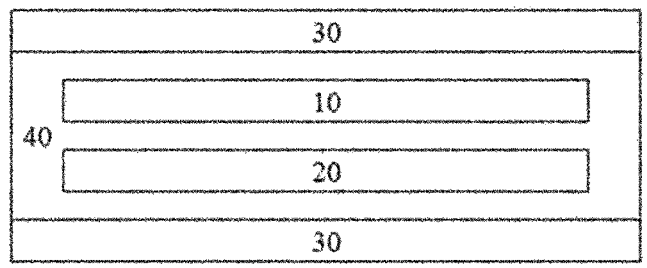
[Figure 8]
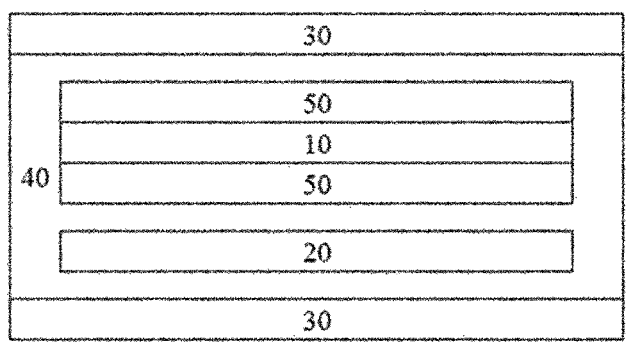

OPTICAL DEVICE

CROSS-REFERENCE TO RELATED APPLICATIONS

The present application is a national phase entry under 35 U.S.C. § 371 of International Application No. PCT/KR2018/004783 filed Apr. 25, 2018, published in Korean, which claims priority from Korean Patent Application No. 10-2017-0053016 filed on Apr. 25, 2017, all of which are incorporated herein by reference.

TECHNICAL FIELD

The present application relates to an optical device.

BACKGROUND ART

Various optical devices are known, which are designed so that transmittance can be varied using liquid crystal compounds.

For example, variable transmittance devices using a so-called GH cell (guest host cell), to which a mixture of a host material and a dichroic dye guest is applied, are known.

Such variable transmittance devices are applied to various applications including eyewear such as sunglasses and eyeglasses, outward walls of a building or sunroofs of a vehicle, and the like.

DISCLOSURE

Technical Problem

The present application provides an optical device.

Technical Solution

The present application is an optical device capable of adjusting transmittance, which relates to, for example, an optical device capable of switching at least between a transparent mode and a black mode.

The transparent mode is a state where the optical device exhibits a relatively high transmittance, and the black mode is a state where the optical device exhibits a relatively low transmittance.

In one example, the optical device may have a transmittance in the transparent mode of about 15% or more, about 20% or more, about 25% or more, about 30% or more, about 35% or more, about 40% or more, about 45% or more, or about 50% or more. Also, the optical device may have a transmittance in the black mode of about 20% or less, about 15% or less, about 10% or less, about 5% or less, about 3% or less, about 1% or less, or about 0.8% or less or so.

The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, about 95%, about 90%, about 85%, about 80%, about 75%, about 70%, about 65%, about 60%, about 55%, about 50%, about 45%, about 40%, about 35%, about 30%, or about 25% or so. The lower limit of the transmittance in the black mode may be about 0%, about 0.5%, about 1%, about 2%, about 3%, about 4%, about 5%, about 6%, about 7%, about 8%, about 9%, or about 10% or so.

The transmittance may be a linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device of the present application, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

The optical device of the present application is designed to be capable of switching at least between the transparent mode and the black mode. If desired, the optical device may also be designed to be capable of implementing, for example, a third mode which may represent any transmittance between the transmittance of the transparent mode and the transmittance of the black mode.

The switching between such modes can be achieved, as the optical device comprises an active liquid crystal element film. Here, the active liquid crystal element film is a liquid crystal element capable of switching between at least two or more oriented states of light axes, for example, first and second oriented states. Here, the optical axis may mean the long axis direction when the liquid crystal compound included in the liquid crystal element is a rod type, and may mean the normal direction of the disc plane when it is a discotic type. For example, in the case where the liquid crystal element comprises a plurality of liquid crystal compounds whose directions of the optical axes are different from each other in any oriented state, the optical axis of the liquid crystal element may be defined as an average optical axis, and in this case, the average optical axis may mean the vector sum of the optical axes of the liquid crystal compounds.

The oriented state in such a liquid crystal element can be changed by applying energy, for example, by applying a voltage. For example, the liquid crystal element may have any one of the first and second oriented states in a state without voltage application, and may be switched to another oriented state when a voltage is applied.

The black mode may be implemented in any one of the first and second oriented states, and the transparent mode may be implemented in another oriented state. For convenience, it is described herein that the black mode is implemented in the first state.

The liquid crystal element film may comprise a liquid crystal layer containing at least a liquid crystal compound. In one example, the liquid crystal layer is a so-called guest host liquid crystal layer, which may be a liquid crystal layer comprising a liquid crystal compound and an anisotropic dye.

The liquid crystal layer is a liquid crystal layer using a so-called guest host effect, which may be a liquid crystal layer in which the anisotropic dyes are aligned according to a alignment direction of the liquid crystal compound (hereinafter, may be referred to as a liquid crystal host). The alignment direction of the liquid crystal host may be adjusted depending on whether or not external energy is applied.

The type of the liquid crystal host used in the liquid crystal layer is not particularly limited, and a general type of liquid crystal compound applied to realize the guest host effect may be used.

For example, as the liquid crystal host, a smectic liquid crystal compound, a nematic liquid crystal compound, or a cholesteric liquid crystal compound may be used. In general, a nematic liquid crystal compound may be used. The nematic liquid crystal compound may be in a rod form or may be in a discotic form.

As such a nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3 or more than 7, or may be less than −2 or less than −3.

The liquid crystal compound may also have optical anisotropy (Δn) of about 0.01 or more, or about 0.04 or more. In another example, the optical anisotropy of the liquid crystal compound may be about 0.3 or less, or about 0.27 or less.

Liquid crystal compounds that can be used as the liquid crystal host of the guest host liquid crystal layer are well known to those skilled in the art, whereby the liquid crystal compound can be freely selected from them.

The liquid crystal layer comprises an anisotropic dye together with the liquid crystal host. The term "dye" may mean a material capable of intensively absorbing and/or modifying light in at least a part or the entire range in a visible light region, for example, a wavelength range of 380 nm to 780 nm, and the term "anisotropic dye" may mean a material capable of anisotropically absorbing light in at least a part or the entire range of the visible light region.

As the anisotropic dye, for example, known dyes known to have properties that can be aligned according to the aligned state of the liquid crystal host may be selected and used. For example, azo dyes or anthraquinone dyes and the like may be used as the anisotropic dyes, and the liquid crystal layer may also comprise one or two or more dyes in order to achieve light absorption in a wide wavelength range.

A dichroic ratio of the anisotropic dye can be appropriately selected in consideration of the object. For example, the anisotropic dye may have a dichroic ratio of 5 or more to 20 or less. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The anisotropic dye may have the dichroic ratio in at least a part of wavelengths or any one wavelength or the entire range in the wavelength range of the visible light region, for example, in the wavelength range of about 380 nm to 780 nm or about 400 nm to 700 nm.

The content of the anisotropic dye in the liquid crystal layer may be appropriately selected in consideration of the object. For example, the content of the anisotropic dye may be selected in a range of 0.1 to 10% by weight based on the total weight of the liquid crystal host and the anisotropic dye. The ratio of the anisotropic dye may be changed in consideration of the desired transmittance and the solubility of the anisotropic dye in the liquid crystal host, and the like.

The liquid crystal layer basically comprises the liquid crystal host and the anisotropic dye, and may further comprise other optional additives according to a known form, if necessary. As an example of the additive, a chiral dopant or a stabilizer can be exemplified, without being limited thereto.

The liquid crystal layer may have an anisotropy degree (R) of about 0.5 or more. The anisotropy degree (R) is determined from absorbance (E(p)) of a light beam polarized parallel to the alignment direction of the liquid crystal host and absorbance (E(s)) of a light beam polarized perpendicularly to the alignment direction of the liquid crystal host according to the following equation.

<Anisotropy Degree Equation>

$$\text{Anisotropy degree } (R) = [E(p) - E(s)] / [E(p) + 2*E(s)]$$

The above-used reference is another identical apparatus that does not contain a dye in the liquid crystal layer.

Specifically, the anisotropy degree (R) may be determined from the value (E(p)) for the absorbance of the liquid crystal layer in which the dye molecules are horizontally oriented and the value (E(s)) for the absorbance of the same liquid crystal layer in which the dye molecules are vertically oriented. The absorbance is measured in comparison with a liquid crystal layer which does not contain any dye at all but has the same constitution. This measurement may be performed, in the case of one vibration plane, using a polarized beam vibrating in a direction parallel to the alignment direction (E(p)) and vibrating in a direction perpendicular to the alignment direction (E(s)) in subsequent measurements. The liquid crystal layer is not switched or rotated during the measurement, and thus the measurement of E(p) and E(s) may be performed by rotating the vibration plane of the polarized incident light.

One example of a detailed procedure is as described below. The spectra for the measurement of E(p) and E(s) can be recorded using a spectrometer such as a Perkin Elmer Lambda 1050 UV spectrometer. The spectrometer is equipped with Glan-Thompson polarizers for a wavelength range of 250 nm to 2500 nm in both of the measuring beam and the reference beam. The two polarizers are controlled by a stepping motor and are oriented in the same direction. The change in the polarizer direction of the polarizer, for example, the conversion of 0 degrees to 90 degrees, is always performed synchronously and in the same direction with respect to the measuring beam and the reference beam. The orientation of the individual polarizers may be measured using the method described in T. Karstens' 1973 thesis in the University of Wurzburg.

In this method, the polarizer is rotated stepwise by 5 degrees with respect to the oriented dichroic sample, and the absorbance is recorded, for example, at a fixed wavelength in the maximum absorption region. A new zero line is executed for each polarizer position. For the measurement of two dichroic spectra E(p) and E(s), anti-parallel-rubbed test cells coated with polyimide AL-1054 from JSR are located in both the measuring beam and the reference beam. Two test cells can be selected with the same layer thickness. The test cell containing a pure host (liquid crystal compound) is placed in the reference beam. The test cell containing a solution of a dye in the liquid crystals is placed in the measuring beam. Two test cells for the measuring beam and the reference beam are installed in a ray path in the same alignment direction. In order to ensure the maximum possible accuracy of the spectrometer, E(p) may be in its maximum absorption wavelength range, for example, a wavelength range of 0.5 to 1.5. This corresponds to transmittance of 30% to 5%. This is set by correspondingly adjusting the layer thickness and/or the dye concentration.

The anisotropy degree (R) can be calculated from the measured values of E(p) and E(s) according to the above equation as shown in a reference [see: "Polarized Light in Optics and Spectroscopy," D. S. Kliger et al., Academic Press, 1990].

In another example, the anisotropy degree (R) may be about 0.55 or more, 0.6 or more, or 0.65 or more. The anisotropy degree (R) may be, for example, about 0.9 or less, about 0.85 or less, about 0.8 or less, about 0.75 or less, or about 0.7 or less.

Such an anisotropy degree (R) can be achieved by controlling the kind of the liquid crystal layer, for example, the kind of the liquid crystal compound (host), the kind and the ratio of the anisotropic dye, or the thickness of the liquid crystal layer, and the like.

It is possible to provide an optical device with high contrast ratio by increasing the difference in the transmittance between the transparent state and the black state while using lower energy through the anisotropy degree (R) in the above range.

The thickness of the liquid crystal layer may be appropriately selected in consideration of the object, for example, the desired anisotropy degree or the like. In one example, the thickness of the liquid crystal layer may be about 0.01 μm or more, 0.05 μm or more, 0.1 μm or more, 0.5 μm or more, 1 μm or more, 1.5 μm or more, 2 μm or more, 2.5 μm or more, 3 μm or more, 3.5 μm or more, 4 μm or more, 4.5 μm or more, 5 μm or more, 5.5 μm or more, 6 μm or more, 6.5 μm or more, 7 μm or more, 7.5 μm or more, 8 μm or more, 8.5 μm or more, 9 μm or more, or 9.5 μm or more. By controlling the thickness in this manner, it is possible to realize an optical device having a large difference in transmittance between the transparent state and the black state, that is, a device having a large contrast ratio. The thicker the thickness is, the higher the contrast ratio can be realized, and thus it is not particularly limited, but it may be generally about 30 μm or less, 25 μm or less, 20 μm or less, or 15 μm or less.

Such an active liquid crystal layer or the liquid crystal element film comprising the same may switch between a first oriented state and a second oriented state different from the first oriented state. The switching may be controlled, for example, through application of external energy such as a voltage. For example, any one of the first and second oriented states may be maintained in a state where the voltage is not applied, and then switched to the other oriented state by applying a voltage.

In one example, the first and second oriented states may be each selected from a horizontal orientation, vertical orientation, twisted nematic orientation, or cholesteric orientation state. For example, in the black mode, the liquid crystal element or the liquid crystal layer may be at least in horizontal orientation, twisted nematic orientation or cholesteric orientation, and in the transparent mode, the liquid crystal element or liquid crystal layer may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as Pascal 2000 from Jasco.

A method of realizing the liquid crystal element of the normally transparent or black mode by adjusting the dielectric constant anisotropy of the liquid crystal host, the alignment direction of the alignment film for orienting the liquid crystal host or the like is known.

The liquid crystal element film may comprise two base films disposed opposite to each other and the active liquid crystal layer between the two base films.

The liquid crystal element film may further comprise spacers for maintaining an interval of the two base films between the two base films and/or a sealant for attaching the base films in a state where the interval of two base films disposed opposite to each other is maintained. As the spacer and/or the sealant, a known material can be used without any particular limitation.

As the base film, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the base film, if necessary.

As the base film, a film having a phase difference in a predetermined range may be used, or an isotropic film may be used. In one example, the base film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 5 nm or less, about 4 nm or less, about 3 nm or less, or about 2 nm or less, about 1 nm or less, or about 0.5 nm or less. In another example, the front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the base film may be, for example, 200 nm or less. The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or 0.5 nm or less, and may be 0 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

However, as the base film, a high phase difference base film, in which the front phase difference is about 2,000 nm or more, 3,000 nm or more, 4,000 nm or more, 5,000 nm or more, 6,000 nm or more, 7,000 nm or more, or 7,500 nm or more, and/or the thickness direction phase difference is about 2000 nm or more, 3,000 nm or more, 4,000 nm or more, 5,000 nm or more, 6,000 nm or more, 7,000 nm or more, about 8,000 nm or more, about 9,000 nm or more, or about 10,000 nm or more, may also be used. The upper limit of the front phase difference or the thickness direction phase difference of the high phase difference base film is not particularly limited, and for example, a base film having a front phase difference of about 10,000 nm or less and/or a thickness direction phase difference of about 15,000 nm or less may also be applied.

In this specification, the front phase difference (Rin) is a numerical value calculated by Equation 1 below, and the thickness direction phase difference (Rth) is a numerical value calculated by Equation 2 below. Unless otherwise specified, the reference wavelength of the front and thickness direction phase differences is about 550 nm.

Front phase difference $(Rin) = d \times (nx - ny)$ [Equation 1]

Thickness direction phase difference $(Rth) = d \times (nz - ny)$ [Equation 2]

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel.

The angle formed by the slow axis of the base film and a light absorption axis of a polarizer to be described below may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize optically excellent and uniform transparent and black modes through the phase difference adjustment or the arrangement of the slow axes.

The base film may have a coefficient of thermal expansion of 100 ppm/K or less. In another example, the coefficient of thermal expansion may be 95 ppm/K or less, 90 ppm/K or less, 85 ppm/K or less, 80 ppm/K or less, 75 ppm/K or less, 70 ppm/K or less, or 65 ppm/K or less, or may be 10 ppm/K or more, 20 ppm/K or more, 30 ppm/K or more, 40 ppm/K or more, 50 ppm/K or more, or 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of about 2% or more may be used. In another example, the elongation at break may be about 4% or more, about 8% or more, about 10% or more, about 12% or more, about 14% or more, about 16% or more, about 20% or more, about 30% or more, about 40% or more, about 50% or more, about 60% or more, about 70% or more, about 80% or more, about 90% or more, 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or 175% or more, and may be 1,000% or less, 900% or less, 800% or less, 700% or less, 600% or less, 500% or less, 400% or less, 300% or less, or 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length). Furthermore, the elongation at break may be, for example, a numerical value for any one of the MD (mechanical direction) direction or the TD (transverse direction) direction of the base film.

By selecting the base film to have such a coefficient of thermal expansion and/or elongation at break, an optical device having excellent durability can be provided.

The thickness of the base film as above is not particularly limited, and for example, may be in a range of about 50 μm to 200 μm or so. The thickness of the base film may be changed as necessary.

Among physical properties mentioned herein, when the measuring temperature or pressure influences the result, the corresponding physical property is measured at normal temperature and normal pressure, unless otherwise specified.

The term normal temperature is a natural temperature without warming or cooling, which may be generally any one temperature in a range of about 10° C. to 30° C., for example, a temperature of about 23° C. or about 25° C. or so. Unless otherwise specified herein, the temperature is a Celsius temperature and the unit is ° C.

The term normal pressure is a natural pressure without lowering or elevating, which generally means a pressure of about one atmosphere, such as atmospheric pressure.

In the liquid crystal element film, a conductive layer and/or an alignment film may be present on one side of the base film, for example, on the side facing the active liquid crystal layer.

The conductive layer present on the side of the base film is a constitution for applying a voltage to the active liquid crystal layer, to which a known conductive layer can be applied without any particular limitation. As the conductive layer, for example, a conductive polymer, a conductive metal, a conductive nanowire, or a metal oxide such as ITO (indium tin oxide) can be applied. Examples of the conductive layer that can be applied in the present application are not limited to the above, and all kinds of conductive layers known to be applicable to the liquid crystal element film in this field can be used.

In one example, an alignment film exists on the side of the base film. For example, a conductive layer may first be formed on one side of the base film, and an alignment film may be formed on its upper part.

The alignment film is a constitution for controlling orientation of the liquid crystal host included in the active liquid crystal layer, and a known alignment film can be applied without particular limitation. As the alignment film known in the industry, there is a rubbing alignment film or a photo alignment film, and the like, and the alignment film that can be used in the present application is the known alignment film, which is not particularly limited.

The alignment direction of the alignment film can be controlled to achieve the orientation of the above-described optical axis. For example, the alignment directions of two alignment films formed on each side of two base films disposed opposite to each other may form an angle in a range of about −10 degrees to 10 degrees, an angle in a range of −7 degrees to 7 degrees, an angle in a range of −5 degrees to 5 degrees or an angle in a range of −3 degrees to 3 degrees to each other, or may be approximately parallel to each other. In another example, the alignment directions of the two alignment films may form an angle in a range of about 80 degrees to 100 degrees, an angle in a range of 80 degrees to 90 degrees, an angle in a range of about 83 degrees to 97 degrees, an angle in a range of about 85 degrees to 95 degrees or an angle in a range of about 87 degrees to 92 degrees, or may be approximately perpendicular to each other. In another example, the alignment directions of the two alignment films may form an angle in a range of about 160 degrees to 200 degrees, an angle in a range of about 170 degrees to 190 degrees, an angle in a range of about 175 degrees to 185 degrees or an angle of about 180 degrees.

Since the direction of the optical axis of the active liquid crystal layer is determined in accordance with such an alignment direction, the alignment direction can be confirmed by checking the direction of the optical axis of the active liquid crystal layer.

The shape of the liquid crystal element film having such a structure is not particularly limited, which may be determined according to the application of the optical device, and is generally in the form of a film or a sheet.

In one example, the liquid crystal element film may be in the form of a folded film. The cross-sectional shape of the liquid crystal element film with the folded film type may include a first line and a second line separated by the folded portion of the film. In one example, the curvature (=1/curvature radius) of the first line in the cross-section of the active liquid crystal element film may be in a range of 0 to 0.01 at the time of observing the cross-section, and the cross-section may have a folded portion at the end of the first line and include a second line connected to the folded portion. That is, the active liquid crystal element film may be contained in the optical device in a folded state at the folded portion. In another example, the curvature of the first line may be about 0.009 or less, 0.008 or less, 0.007 or less, 0.006 or less, 0.005 or less, 0.004 or less, 0.003 or less, 0.002 or less, 0.001 or less, 0.0009 or less, 0.0008 or less, 0.0007 or less, 0.0006 or less, 0.0005 or less, 0.0004 or less, 0.0003 or less, 0.0002 or less, 0.0001 or less, 0.00009 or less, 0.00008 or less, 0.00007 or less, 0.00006 or less, or 0.00005 or less.

In this specification, the curvature or curvature radius may be measured in a manner known in the industry, and for example, may be measured using a contactless apparatus such as a 2D profile laser sensor, a chromatic confocal line sensor or a 3D measuring conforcal microscopy. The method of measuring the curvature or curvature radius using such an apparatus is known.

With respect to the curvatures or curvature radius, for example, when the curvatures or curvature radii are different on the surface and the back surface of the object to which the curvature or curvature radius is referred (for example, when the curvatures or curvature radii in the surface and the back surface of the liquid crystal element film corresponding to the first line are different), a small value, a large value or an arithmetic average value of curvatures or curvature radii of the surface and the back surface may be designated as the curvature or curvature radius. Furthermore, when the curvatures or curvature radii are not constant and have different portions, the largest curvature or curvature radius, or the smallest curvature or curvature radius or the average value of curvatures or curvature radii may be a reference.

Furthermore, in this specification, the unit of curvature radius is R, and the unit of curvature is 1/R. Here, R denotes a curved gradient of a circle having a radius of 1 mm Thus, here, for example, 100R is the degree of curvature of a circle with a radius of 100 mm or the curvature radius for such a circle. In the case of a flat surface, the curvature is zero and the curvature radius is infinite.

As described below, in the optical device of the present application, the active liquid crystal element film and/or the polarizer may be encapsulated in a state where the active liquid crystal element film and/or the polarizer are positioned inside two outer substrates to constitute an optical device. Such an encapsulated structure greatly improves durability and weatherability of the optical device, and as a result, it can be stably applied to outdoor applications such as sunroofs. However, such an encapsulation process generally requires a vacuum compression process such as an autoclave, and in the process, there is a problem that defects such as wrinkles occur in the active liquid crystal element film, and the like. In addition, when the optical device is exposed to high temperature and/or high humidity conditions, and the like, or in the process, defects such as wrinkles are formed on the liquid crystal element film by the difference in coefficient of thermal expansion between the base film of the liquid crystal element film and an adhesive film (encapsulating agent) attached thereto, and the like, such defects adversely affect the performance of the optical device.

Thus, in the present application, it has been confirmed that the above problem can be solved when the active liquid crystal element film is implemented with the folded structure.

BRIEF DESCRIPTION OF THE DRAWINGS

FIGS. 1 to 3 are drawings for explaining a folded structure of a liquid crystal element film of the present application.

FIGS. 4 to 8 are illustrative drawings for explaining an optical device of the present application.

DETAILED DESCRIPTION

FIG. 1 is a diagram schematically showing a cross-section of the active liquid crystal element film (10) having the folded film shape.

As in FIG. 1, the cross-section of the active liquid crystal element film (10) may have a cross-section in the form in which a first line (101), a folded portion (A) and a second line (102) are connected.

Here, the first line (101) may be an active area, that is, an area serving to modulate light in order to substantially control a light transmission state. Such a first line (101) may be a planar shape, which has a curvature of approximately 0, or may also be a curved shape, such as a convex shape or a concave shape.

As shown in FIG. 1, the liquid crystal element film (10) has a folded structure based on the folded portion (A), and thus a second line (102) is formed. At this time, the degree to which the second line (102) is folded is not particularly limited as long as it is controlled to such an extent that defects such as wrinkles of the liquid crystal element film (10) do not occur in the optical device. In one example, the degree of folding may be set such that the angle formed by the first line (101) or the tangent (T) of the first line (101) and the second line (102) is, in a clockwise or counterclockwise direction, more than 0 degrees, 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, 60 degrees or more, 65 degrees or more, 70 degrees or more, 75 degrees or more, 80 degrees or more, or 85 degrees or more or so. In another example, the angle may be 180 degrees or less, 170 degrees or less, 160 degrees or less, 150 degrees or less, 140 degrees or less, 130 degrees or less, 120 degrees or less, 110 degrees or less, 100 degrees or less, or 95 degrees or less or so. Here, the tangent at which the angle with the second line (102) is measured is a tangent at the point (D) which divides the first line (101) approximately by two. Also, the second line for measuring the angle for the tangent (T) may be a line (1022) connecting the folded portion (A) to the point where the second line (102) is terminated, as shown in FIG. 1. Furthermore, as described below, when the second line (102) is also in a folded form, the second line for measuring the angle for the tangent (T) may be a line connecting a folded portion (A in FIG. 1) separating the first line and the second line, and a folded portion in the second line, or may be, the same as above, a line connecting the point where the second line is terminated.

Furthermore, in this specification, the angle formed by the first line or the tangent of the first line and the second line may be simply referred to as a folded angle of an active liquid crystal element film.

The ratio (L1/L2) of the length (L1) of the first line (101) to the length (L2) of the second line (102) may be in a range of about 1.5 to 20,000. In another example, the ratio (L1/L2) may be about 2 or more, about 4 or more, about 6 or more, about 8 or more, about 10 or more, about 12 or more, about 14 or more, about 16 or more, about 18 or more, about 20 or more, about 25 or more, about 30 or more, about 35 or more, about 40 or more, about 45 or more, about 50 or more, about 55 or more, about 60 or more, about 65 or more, about 70 or more, about 75 or more, about 80 or more, about 85 or more, about 90 or more, about 95 or more, about 100 or more, about 110 or more, about 120 or more, about 130 or more, about 140 or more, about 150 or more, about 160 or more, about 170 or more, about 180 or more, about 190 or more, about 200 or more, about 250 or more, about 300 or more, about 350 or more, about 400 or more, about 450 or more, about 500 or more, about 550 or more, about 600 or more, about 650 or more, about 700 or more, about 800 or more, about 900 or more, about 1000 or more, about 1100 or more, about 1200 or more, about 1500 or more, 2000 or more, 2500 or more, 3000 or more, or 3500 or more, and may be 3500 or less, 3000 or less, 2900 or less, 2800 or less, 2700 or less, 2600 or less, 2500 or less, 2400 or less, 2300 or less, 2200 or less, 2100 or less, 2000 or less, about 1,900 or less, about 1,800 or less, about 1,700 or less, about 1,600 or less, about 1,500 or less, about 1,400 or less, about 1,300 or less, about 1,200 or less, about 1,100 or less, about 1,000 or less, about 900 or less, about 800 or less, about 750 or less, about 700 or less, about 650 or less, about 600 or less, about 550 or less, about 500 or less, about 450 or less, about 400 or less, about 350 or less, about 300 or less, about 250 or less, about 200 or less, about 150 or less, about 100 or less, about 50 or less, about 45 or less, about 40 or less, about 35 or less, about 30 or less, about 25 or less, about 20 or less, or about 15 or less.

In such a relationship, the absolute lengths of the first line (101) and the second line (102) are not particularly limited, which may be determined according to the intended use of the optical device or the like. For example, the length of the first line (101) may be adjusted to be about 100 to 1,000 mm or so. In another example, the length of the first line (101) may be about 150 mm or more, about 200 mm or more, or about 250 mm or more. In another example, the length of the first line (101) may be about 900 mm or less, about 800 mm or less, about 700 mm or less, about 600 mm or less, about 500 mm or less, about 400 mm or less, about 350 mm or less, or about 300 mm or less.

In addition, as described below, when a plurality of second lines are formed in the cross-section of the active liquid crystal element film, the length of the second line introduced into the ratio (L1/L2) calculation may be a length of any one line of the plurality of second lines, or may be the sum of the lengths of the second lines.

The folded structure may be formed at both ends in the cross-section of the liquid crystal element film. Accordingly, as in FIG. 1, the folded portions (A) and the second lines (102) may be formed at both ends of the first line (101) in the cross-section of the active liquid crystal element film.

In such a structure, the second line may be further folded, and for example, as shown in FIG. 2, a second folded portion (AA) exists on the second line (102), where the cross-section in the form that the second line (102) is further folded in the folded portion (AA) may be realized.

In this case, the forming position of the additionally formed folded portion (AA) is not particularly limited, and for example, the position may be adjusted so that the distance from the folded area (A) formed at the connecting portion of the first line (101) and the second line (102) to the folded area (AA) formed on the second line (102) becomes L2 satisfying the above-mentioned ratio (L1/L2).

The cross-section of the liquid crystal element film in which such a cross-section is observed is a cross-section observed when the liquid crystal element film has been observed from any side. That is, the cross-section is preferably observed on any one side of the sides of the liquid crystal element film.

In one example, the cross-section in which the folded structure is observed may be a cross-section on a normal plane formed by including the long axis or the short axis of the liquid crystal element film. Here, for example, in the case where the liquid crystal element film (10) is observed from above, when it is the rectangular shape as in FIG. 3, the long axis may be the long side (LA) of horizontal and vertical lengths, and the short axis may be the short side (SA).

For example, the cross-sectional structure may be realized by folding a portion indicated by a dotted line in the liquid crystal element film (10) having the same structure as FIG. 3.

When the liquid crystal element film has a square shape, any one of the horizontal axis and the vertical axis may be regarded as the long axis and the other may be regarded as the short axis.

Furthermore, in the case of a shape other than a rectangular shape, for example, in the case of an elliptical, circular or amorphous shape, and the like, when the liquid crystal element film is observed from above, a line perpendicular to the line formed by the folded portion (for example, a dotted line in FIG. 3) may be any one of the short axis and the long axis, and a line which is again perpendicular to the line may be the other of the short axis and the long axis.

In one example, as shown in FIG. 3, all four sides of the liquid crystal element film can be folded to form the cross-section, and in this case, the cross-section may be observed on both the normal plane including the long axis of the liquid crystal element film and the normal plane including the short axis.

Although the position of the above-mentioned sealant in the liquid crystal element film having such a folded structure is not particularly limited, generally, the sealant attaching the two base films may exist in the folded portion (A in FIGS. 1 and 2) or an area facing from the folded portion (A in FIGS. 1 and 2) toward the first line (101).

The optical device may further comprise a polarizer together with the active liquid crystal element film. As the polarizer, for example, an absorbing or reflecting linear polarizer, that is, a polarizer having a light absorption axis or a light reflection layer formed in one direction and a light transmission axis formed approximately perpendicular thereto may be used.

Assuming that the blocking state is implemented in the first oriented state of the active liquid crystal layer, the polarizer may be disposed in the optical device such that the angle formed by an average optical axis (vector sum of optical axes) of the first oriented state and the light absorption axis of the polarizer is 80 degrees to 100 degrees or 85 degrees to 95 degrees, or it is approximately perpendicular, or may be disposed in the optical device such that it is 35 degrees to 55 degrees or 40 degrees to 50 degrees or about 45 degrees.

When the alignment direction of the alignment film is used as a reference, the alignment directions of the alignment films formed on each side of the two base films of the liquid crystal element film disposed opposite to each other as described above may form, to each other, an angle in a range of about −10 degrees to 10 degrees, an angle in a range of −7 degrees to 7 degrees, an angle in a range of −5 degrees to 5 degrees or an angle in a range of −3 degrees to 3 degrees, or in the case of being approximately parallel to each other, the angle formed by the alignment direction of any one of the two alignment films and the light absorption axis of the polarizer may be 80 degrees to 100 degrees or 85 to 95 degrees, or may be approximately perpendicular.

In another example, the alignment directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or in the case of being approximately vertical to each other, the angle formed by the alignment direction of the alignment film disposed closer to the polarizer of the two alignment films and the light absorption axis of the polarizer may be 80 degrees to 100 degrees or 85 degrees to 95 degrees, or may be approximately perpendicular.

For example, as shown in FIG. 4, the liquid crystal element film (10) and the polarizer (20) may be disposed in a state of being laminated on each other such that the optical axis (average optical axis) of the first alignment direction in the liquid crystal element film (10) and the light absorption axis of the polarizer (20) become the above relationship.

In one example, when the polarizer (20) is a polarizing coating layer to be described below, a structure in which the polarizing coating layer is present inside the liquid crystal element film can be realized. For example, as shown in FIG. 5, a structure in which the polarizing coating layer (201) is present between any one base film (110) of the base films (110) of the liquid crystal element film and the active liquid crystal layer (120) can be realized. For example, the conductive layer, the polarizing coating layer (201) and the alignment film as described above may be sequentially formed on the base film (110).

The kind of the polarizer that can be applied in the optical device of the present application is not particularly limited. For example, as the polarizer, a conventional material used in conventional liquid crystal displays (LCDs) or the like, such as a PVA (poly(vinyl alcohol)) polarizer, or a polarizer implemented by a coating method such as a polarizing coating layer comprising lyotropic liquid crystals (LLCs) or reactive mesogens (RMs) and a dichroic dye can be used. In this specification, the polarizer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of about 30 to 40 or so may be used. On the other hand, when the polarizing coating layer contains reactive mesogens (RMs) and a dichroic dye, as the dichroic dye, a linear dye may be used, or a discotic dye may also be used.

Mixtures of lyotropic liquid crystals or reactive mesogens and a dichroic dye that can act as an absorbing or reflecting linear polarizer are variously known in the industry, and such a kind can be applied without limitation to the present application.

The optical device of the present application may comprise only each one of the active liquid crystal element film and the polarizer as described above. Thus, the optical device may comprise only one active liquid crystal element film and may comprise only one polarizer.

The optical device may further comprise two outer substrates disposed opposite to each other. For example, as shown in FIG. 6, the active liquid crystal element film (10) and the polarizer (20) may exist between the two substrates (30) disposed opposite to each other. FIG. 6 has illustrated the case where the active liquid crystal element film (10) and the polarizer (20) are present simultaneously between the outer substrates (30), but the structure is exemplary, where only any one of the active liquid crystal element film (10) or the polarizer (20) may also exist. Also, the polarizer (20) in FIG. 6 does not exist, and only the active liquid crystal element film including the polarizing coating layer (201) as shown in FIG. 5 may also exist between the outer substrates (30).

As the outer substrate, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethyleneterephtalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

As the outer substrate, a film having a phase difference in a predetermined range may be used. In one example, the outer substrate may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, or about 2 nm or less, or about 1 nm or less. In another example, the front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the outer substrate may be, for example, 200 nm or less. The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less, and may be 0 nm or more, 5 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

The front phase difference (Rin) and the thickness direction phase difference (Rth) of the outer substrate may be calculated in the same manner, except that in Equations 1 and 2 above, the thickness (d), the refractive index in the slow axis direction (nx), the refractive index in the fast axis direction (ny) and the refractive index in the thickness direction (nz) are substituted with the thickness (d), the refractive index in the slow axis direction (nx), the refractive index in the fast axis direction (ny) and the refractive index in the thickness direction (nz), of the outer substrate, respectively, to calculate them.

When the outer substrate is optically anisotropic, the angle formed by the slow axes of the outer substrates disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel.

Also, the angle formed by the slow axis of the outer substrate and, in the case where the above-described base film is optically anisotropic, the slow axis of the base film may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize optically excellent and uniform transparent and black modes through the phase difference adjustment or the arrangement of the slow axes.

As the outer substrate, a substrate having a coefficient of thermal expansion of 100 ppm/K or less may be used. In another example, the coefficient of thermal expansion may be 95 ppm/K or less, 90 ppm/K or less, 85 ppm/K or less, 80 ppm/K or less, 75 ppm/K or less, 70 ppm/K or less, 65 ppm/K or less, 60 ppm/K or less, 50 ppm/K or less, 40 ppm/K or less, 30 ppm/K or less, 20 ppm/K or less, or 15 ppm/K or less, or may be 1 ppm/K or more, 2 ppm/K or more, 3 ppm/K or more, 4 ppm/K or more, 5 ppm/K or more, 6 ppm/K or more, 7 ppm/K or more, 8 ppm/K or more, 9 ppm/K or more, or 10 ppm/K or more.

The methods of measuring the coefficient of thermal expansion and the elongation at break of the outer substrate are the same as the methods of measuring the coefficient of thermal expansion and elongation at break of the base film as described above.

By selecting the outer substrate to have such a coefficient of thermal expansion and/or elongation at break, an optical device having excellent durability can be provided.

The thickness of the outer substrate as above is not particularly limited, and for example, may be about 0.3 mm or more. In another example, the thickness may be about 0.5 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, or 3 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

In addition, in the case of having the curved surface shape at the same time, the respective curvatures or curvature radii may be the same or different.

The curvature or curvature radius of the outer substrate can be measured in the above-described manner.

Also, regarding the outer substrate, for example, when the curvatures or the curvature radii at the front surface and the back surface are different from each other, the curvatures or curvature radii of the respective facing surfaces, that is, the curvature or curvature radius of the surface facing a second outer substrate in the case of a first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius, or the smallest curvature or curvature radius, or the average curvature or average curvature radius may be a reference.

Both of the substrates may have a difference in curvature or curvature radius within 10%, within 9%, within 8%, within 7%, within 6%, within 5%, within 4%, within 3%, within 2% or within 1%. When a large curvature or curvature radius is $C_L$ and a small curvature or curvature radius is $C_S$, the difference in curvature or curvature radius is a value calculated by $100 \times (C_L - C_S)/C_S$. In addition, the lower limit of the difference in curvature or curvature radius is not particularly limited. Since the differences in curvatures or curvature radii of two outer substrates can be the same, the difference in curvature or curvature radius may be 0% or more, or more than 0%.

The control of such a curvature or curvature radius is useful in a structure in which an active liquid crystal element and/or a polarizer are encapsulated by an adhesive film as in the optical device of the present application.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

The specific range of each curvature or curvature radius of the first and second outer substrates is not particularly limited. In one example, the curvature radius of each substrate may be 100R or more, 200R or more, 300R or more, 400R or more, 500R or more, 600R or more, 700R or more, 800R or more, or 900R or more, or may be 10,000R or less, 9,000R or less, 8,000R or less, 7,000R or less, 6,000R or less, 5,000R or less, 4,000R or less, 3,000R or less, 2,000R or less, 1,900R or less, 1,800R or less, 1,700R or less, 1,600R or less, 1,500R or less, 1,400R or less, 1,300R or less, 1,200R or less, 1,100R or less, or 1,050R or less. Here, R denotes a curved gradient of a circle having a radius of 1 mm Thus, here, for example, 100R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

That is, for the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal element and/or polarizer, and bubbles may be formed inside.

However, when the curvatures or curvature radii between the substrates are controlled as described above, even if the adhesion force by the adhesive film is lowered, a net force which is the sum of the restoring force and the gravity may act thereon to prevent the widening and also to withstand the same process pressure as the autoclave.

The optical device may further comprise an adhesive film encapsulating the active liquid crystal element film and/or the polarizer in the outer substrates. For example, as shown in FIG. 7, the adhesive film (40) may be present between the outer substrate (30) and the active liquid crystal element film (10), between the active liquid crystal element film (10) and the polarizer (20) and/or between the polarizer (20) and the outer substrate (30). In addition, the adhesive film (40) may be present on the sides of the active liquid crystal element film (10) and/or the polarizer (20), appropriately, on all sides, as shown in the drawing. The adhesive film may encapsulate the active liquid crystal element film (10) and the polarizer (20) while attaching the outer substrate (30) and the active liquid crystal element film (10), the active liquid crystal element film (10) and the polarizer (20), and the polarizer (20) and the outer substrate (30) to each other.

Furthermore, as shown in FIG. 5, when the active liquid crystal element film in which the polarizing coating layer (201) is formed inside is encapsulated, the adhesive film may be present between the outer substrate and the active liquid crystal element film and/or on the sides of the active liquid crystal element film, preferably, on all sides.

For example, after laminating outer substrates, an active liquid crystal element film, a polarizer and/or an adhesive film according to a desired structure, the above structure can be realized by a method of pressing them in a vacuum state, for example, an autoclave method.

For efficiently forming such a structure, a friction coefficient of the surface of the active liquid crystal element film contacting the adhesive film against the adhesive film or a friction coefficient between the active liquid crystal element film and the adhesive film can be controlled, if necessary. For example, the friction coefficient may be controlled to about 5 or less, about 4.5 or less, about 4 or less, about 3.5 or less, about 3 or less, or about 2.5 or less or so, and in another example, the friction coefficient may be about 0.5 or more, about 1 or more, or about 1.5 or more. Through the control of such a friction coefficient, the efficient encapsulation process can proceed without generating defects, such as wrinkles, in the liquid crystal element film in a pressurizing process such as an autoclave. Here, the friction coefficient is a dynamic friction coefficient.

The method of controlling the friction coefficient is not particularly limited, and for example, an adhesive film and a base film of an active liquid crystal element film, which have desired friction coefficients, may be selected, or an appropriate surface treatment may be performed on the base film. At this time, the surface treatment may control concave-convex shapes of the base film, as a physical treatment, for example, through polishing using a sandpaper or the like, or may control the friction coefficient by treating the surface of the base film using a treating agent known as a so-called release agent or slipping agent, and the like, such as a fluorine-based treating agent or a silicon-based treating agent.

As the adhesive film, a known material can be used without any particular limitation, and for example, among a known thermoplastic polyurethane adhesive film, polyamide adhesive film, polyester adhesive film, EVA (ethylene vinyl acetate) adhesive film, polyolefin adhesive film such as polyethylene or polypropylene, and the like, one satisfying physical properties to be described below can be selected.

As the adhesive film, a film having a phase difference in a predetermined range may be used. In one example, the adhesive film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less. The front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of the thickness direction phase difference of the adhesive film may be, for example, 200 nm or less. In another example, the absolute value may be about 190 nm or less, 180 nm or less, 170 nm or less, 160 nm or less, 150 nm or less, 140 nm or less, 130 nm or less, 120 nm or less, 115 nm or less, 100 nm or less, 90 nm or less, 80 nm or less, 70 nm or less, 60 nm or less, 50 nm or less, 40 nm or less, 30 nm or less, 20 nm or less, 10 nm or less, or about 5 nm or less, or may be 0 nm or more, 1 nm or more, 2 nm or more, 3 nm or more, 4 nm or more, 5 nm or more, 6 nm or more, 7 nm or more, 8 nm or more, 9 nm or more, 10 nm or more, 20 nm or more, 30 nm or more, 40 nm or more, 50 nm or more, 60 nm or more, 70 nm or more, 80 nm or more, or 90 nm or more. As long as the thickness direction phase difference has an absolute value in the above range, it may be negative, or may be positive.

The front phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz) are substituted with the thickness (d), the refractive index in the slow axis direction (nx), the refractive index in the fast axis direction (ny) and the refractive index in the thickness direction (nz), of the adhesive film, respectively, to calculate them.

Here, the thickness of the adhesive film may be a thickness of the adhesive film between the outer substrate (30) and the active liquid crystal layer (10), such as an interval between the two, a thickness of the adhesive film between the active liquid crystal layer (10) and the polarizer (20), such as an interval between the two, and a thickness of the adhesive film between the polarizer (20) and the outer substrate (30), such as an interval between the two.

As the adhesive film, one having a Young's modulus in a range of 0.1 to 100 MPa may be used. The Young's modulus may be measured in accordance with ASTM D882 standard, and may be measured by tailoring the film in the form provided by the corresponding standard and using equipment capable of measuring stress-strain curve (capable of simultaneously measuring force and length).

By selecting the adhesive film to have such a Young's modulus, an optical device with excellent durability can be provided.

The thickness of such an adhesive film is not particularly limited, which may be, for example, in a range of about 200 μm to 600 μm. Here, the thickness of the adhesive film may be a thickness of the adhesive film between the outer substrate (30) and the active liquid crystal layer (10), such as an interval between the two, a thickness of the adhesive film between the active liquid crystal layer (10) and the polarizer (20), such as an interval between the two, and a thickness of the adhesive film between the polarizer (20) and the outer substrate (30), such as an interval between the two.

The optical device may further comprise a buffer layer. Such a buffer layer may be present on one side or both sides of the liquid crystal element film. FIG. 8 shows a structure in which the buffer layer (50) is present on both sides of the active liquid crystal element film (10), but the buffer layer (50) may also be present only on one side of the liquid crystal element film (10).

Such a buffer layer can mitigate the negative pressure caused by the difference in the coefficient of thermal expansion between layers in a structure in which the active liquid crystal element film is encapsulated by an adhesive film, and enable so that a more durable device can be realized.

In one example, as the buffer layer, a layer having a Young's modulus of 1 MPa or less may be used. In another example, the Young's modulus of the buffer layer may be 0.9 MPa or less, 0.8 MPa or less, 0.7 MPa or less, 0.6 MPa or less, 0.6 MPa or less, 0.1 MPa or less, 0.09 MPa or less, 0.08 MPa or less, 0.07 MPa or less, or 0.06 MPa or less. In another example, the Young's modulus is about 0.001 MPa or more, 0.002 MPa or more, 0.003 MPa or more, 0.004 MPa or more, 0.005 MPa or more, 0.006 MPa or more, 0.007 MPa or more, 0.008 MPa or more, 0.009 MPa or more, 0.01 MPa or more, 0.02 MPa or more, 0.03 MPa or more, 0.04 MPa or more, or 0.045 MPa or more. Here, the measurement method of the Young's modulus is the same as the above-mentioned measuring method of the adhesive film.

As a specific kind of the buffer layer, a transparent material showing the above-mentioned Young's modulus may be used without particular limitation, and for example, an acrylate-based, urethane-based, rubber-based or silicone-based oligomer or polymer material, and the like can be used.

In one example, the buffer layer may be formed using a transparent adhesive or a transparent pressure-sensitive adhesive known as a so-called OCA (optical clear adhesive) or OCR (optical clear resin), and a material having a desired Young's modulus may be selected from the adhesives or the pressure-sensitive adhesives known as the OCA or OCR and used.

Therefore, in one example, the buffer layer may be an acrylate-based adhesive layer, a urethane-based adhesive layer, a rubber-based adhesive layer or a silicone-based adhesive layer, or may be an acrylate-based pressure-sensitive adhesive layer, a urethane-based pressure-sensitive adhesive layer, a rubber-based pressure-sensitive adhesive layer or a silicone-based pressure-sensitive adhesive layer.

The thickness of the buffer layer is not particularly limited, which may be selected within a range that can effectively reduce the negative pressure generated inside the device by exhibiting the Young's modulus in the above range.

The optical device may further comprise any necessary configuration other than the above configurations, and for example, comprise a known configuration such as a retardation layer, an optical compensation layer, an antireflection layer and a hard coating layer in a proper position.

Such an optical element can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including a body in which at least one opening is formed, the optical device or the sunroof for a vehicle attached to the opening can be mounted and used.

Advantageous Effects

The present application provides an optical device capable of varying transmittance, and such an optical device can be used for various applications such as eyewear, for example, sunglasses or AR (augmented reality) or VR (virtual reality) eyewear, an outer wall of a building or a sunroof for a vehicle.

EXAMPLES

Hereinafter, the scope of the present application will be described in more detail through Examples and Comparative Examples, but the scope of the present application is not limited by the following examples.

The physical properties described in this specification are the results of evaluation in the following manner 1. Phase Difference Evaluation Method Phase differences of a base film, outer substrates and an adhesive film were measured for a wavelength of 550 nm using Axoscan from Axomatrix according to the manufacturer's manual.

2. Evaluation of Tensile Properties

Tensile properties of a base film such as elongation at break were confirmed according to ASTM D882 standard. Each physical property was evaluated by tailoring a measuring object such as the base film to have a width of 10 mm and a length of 30 mm and then stretching it at a tensile rate of 10 mm/min at room temperature (25° C.) using a UTM (universal testing machine) instrument (Instron 3342).

3. Evaluation of Coefficient of Thermal Expansion

The coefficient of thermal expansion (CTE) of the base film or the like was measured using a TMA (thermomechanical analysis) instrument (SDTA840, Metteler toledo) according to ASTM D696 standard, where dimensional changes of a specimen were measured while increasing a temperature from 40° C. to 80° C. at a rate of 10° C./min to confirm the coefficient of thermal expansion in the section according to an equation (CTE=(dt/t)/dT, where t is a dimension and T is a temperature). The reference length of the specimen at the time of measurement was set as 10 mm, and the load was set as 0.02 N.

4. Evaluation of Friction Coefficient

The measurement of the friction coefficient was performed according to the standard using the FP-2260 instrument from Thwing Albert Instrument Company. Specifically, an adhesive film and an active liquid crystal element film were overlapped and placed, and a friction force was calculated through a ratio of the force measured while pulling the instrument relative to a normal force to obtain a dynamic friction coefficient. The sizes of the specimens were each about 4 cm in length and about 2 cm in width.

Example 1

A GH (guest-host) liquid crystal element film was produced as an active liquid crystal element film. In a state where two PET (poly(ethylene terephthalate) films (coefficient of thermal expansion: about 70 ppm/K, elongation at break: MD (mechanical direction) direction=about 6%, TD (transverse direction) direction=about 70%), in which an ITO (indium tin oxide) electrode layer and a liquid crystal alignment film were sequentially formed on one side, were disposed opposite to each other so as to maintain a cell gap of about 12 μm or so, the liquid crystal element film was produced by injecting a mixture of a liquid crystal host (MAT-16-969 liquid crystals from Merck) and a dichroic dye guest (BASF, X12) therebetween and sealing the frame with a sealant. The opposed arrangement of the PET films was subjected such that the side on which the alignment film was formed faced each other. The liquid crystal layer of the active liquid crystal element film may be in a horizontally oriented state when a voltage is not applied and may be switched to a vertically oriented state by voltage application. Subsequently, an optical device was produced by laminating a glass substrate having a thickness of about 3 mm, an adhesive film, a PVA (polyvinyl alcohol)-based polarizing film, an adhesive film, the active liquid crystal element film, an adhesive film and a glass substrate having a thickness of about 3 mm as well in the above-mentioned order to produce a laminate, performing an autoclave process at a temperature of about 100° C. and a pressure of about 2 atmospheres, and encapsulating the active liquid crystal element film and the PVA-based polarizing film between the outer substrates by the adhesive film. Here, when the liquid crystal layer of the active liquid crystal element film was in the horizontally oriented state, the optical axis thereof and the light absorption axis of the PVA-based polarizing film were arranged so as to be perpendicular to each other. As the adhesive film, a TPU (thermoplastic polyurethane) adhesive film (thickness: about 0.40 mm) having the trade name ST6050 from ArgoTec was used, where the in-plane retardation (Rin, based on 550 nm) of the film was about 2.6 nm, the thickness direction phase difference (Rth, based on 550 nm) was about 4 nm and the coefficient of thermal expansion was about 40 ppm/K. The friction coefficient between the surface of the PET film of the active liquid crystal element film and the TPU adhesive film was about 6.1.

Example 2

An optical device was produced in the same manner as in Example 1, except that the surface of the PET film contacting the TPU adhesive film was polished with a sandpaper to adjust so that the friction coefficient between the surface of the PET film and the TPU adhesive film was about 2.3.

Test Example

The durability was evaluated by a method of evaluating the transmittance characteristics after maintaining each of the produced optical devices at 100° C. for 7 days. As a result of the durability evaluation, it was confirmed that the optical characteristics described in Table 1 below were maintained before and after the maintenance at 100° C. for 7 days, and thus it had excellent durability. In addition, Table 1 below is the results of measuring transmittance and haze (reference wavelength: about 550 nm) of the optical devices in Examples 1 and 2. The transmittance or like was evaluated by an ISO 13468 method using an NDH5000 instrument. It can be confirmed from Table 1 below that the optical device of the present application exhibits appropriate variable transmittance characteristics.

TABLE 1

|  |  | Transmittance | | Haze | |
| --- | --- | --- | --- | --- | --- |
|  |  | Example 1 | Example 2 | Example 1 | Example 2 |
| Applied Voltage | 0 V | 2.6% | 2.5% | 6.8% | 7.1% |
|  | 20 V | 26.3% | 27.3% | 2.6% | 1.6% |

EXPLANATION OF REFERENCE NUMERALS AND SYMBOLS

10: active liquid crystal element film
101: first line

102: second line
A, AA: folded area
D: bisector of the first line
T: tangent of the bisector of the first line
P: normal to the tangent of the bisector of the first line
1022: line for measuring the angle of the second line
20: polarizer
201: polarizing coating layer
30: outer substrate
40: adhesive film
50: buffer layer
110: base film
120: active liquid crystal layer

The invention claimed is:

1. An optical device comprising:
   first and second outer substrates disposed opposite to each other;
   an active liquid crystal element film having an active liquid crystal layer which contains a liquid crystal compound and is capable of switching between a first oriented state and a second oriented state;
   a polarizer; and
   a same adhesive material existing between the first outer substrate and the active liquid crystal element film, between the active liquid crystal element film and the polarizer, between the polarizer and the second outer substrate, and on sides of the active liquid crystal element film;
   wherein the active liquid crystal element film and the polarizer are positioned between the first and second outer substrates and are separately encapsulated by the same adhesive material,
   wherein a dynamic friction coefficient between a surface of the active liquid crystal element film and the adhesive material is 0.5 or more and 5 or less,
   wherein the active liquid crystal element film comprises two plastic films disposed opposite to each other and the active liquid crystal layer is between the two plastic films,
   wherein each of the two plastic films has a coefficient of thermal expansion in a range of 10 ppm/K or more, and
   wherein the adhesive material has a front phase difference in a range of 1 nm or more and an absolute value of a thickness direction phase difference in a range of 2 nm or more.

2. The optical device according to claim 1, wherein the adhesive material is a thermoplastic polyurethane film.

3. The optical device according to claim 1, wherein the active liquid crystal element film and the polarizer are disposed such that an angle formed by an average optical axis of the active liquid crystal layer in the first oriented state and a light absorption axis of the polarizer is in a range of 80 degrees to 100 degrees or 35 degrees to 55 degrees.

4. The optical device according to claim 1, wherein the active liquid crystal element film further comprises spacers for maintaining an interval of the two base films between the two base films.

5. The optical device according to claim 1, wherein each of the two plastic films has a coefficient of thermal expansion in a range of 55 ppm/K or more.

6. The optical device according to claim 1, wherein each of the two plastic films further comprises a respective alignment film present on a side of the plastic film facing the active liquid crystal layer.

7. The optical device according to claim 6, wherein an angle formed by alignment directions of the respective alignment films of the two plastic films is in a range of −10 degrees to 10 degrees, in a range of 80 degrees to 90 degrees, or in a range of 160 degrees to 200 degrees.

8. The optical device according to claim 6, wherein a first one of the two plastic films is closer to the polarizer than a second one of the two plastic films, and wherein an angle formed by:
   an alignment direction of the alignment film formed on the first base film; and
   a light absorption axis of the polarizer
   is in a range of 80 degrees to 100 degrees.

9. The optical device according to claim 1, wherein the active liquid crystal element film is in a folded film form.

10. The optical device according to claim 1, wherein the adhesive material has the front phase difference in a range of 2 nm or more.

11. The optical device according to claim 1, wherein the adhesive material has an absolute value of the thickness direction phase difference in a range of 3 nm or more.

12. The optical device according to claim 1, wherein the adhesive material has a Young's modulus in a range of 0.1 to 100 MPa.

13. An automobile comprising:
    a body on which one or more openings are formed; and
    the optical device of claim 1 attached to the openings.

14. The optical device according to claim 1, wherein the adhesive material is applied to each of the first outer substrate, the active liquid crystal element film, the polarizer and the second outer substrate by an autoclave process.

15. The optical device according to claim 14, wherein the first and second outer substrates are curved, and wherein a curvature of each of the first and second outer substrates is controlled to provide a restoring force to the adhesive material sufficient to avoid forming bubbles between the first and second outer substrates due to widening of the adhesive material during an autoclave process.

* * * * *